United States Patent [19]
Yamane

[11] Patent Number: 5,622,412
[45] Date of Patent: Apr. 22, 1997

[54] QUICK RELEASE APPARATUS FOR A BICYCLE

[75] Inventor: Takuro Yamane, Sakai, Japan

[73] Assignee: Shimano, Inc., Osaka, Japan

[21] Appl. No.: 357,595

[22] Filed: Dec. 13, 1994

[30] Foreign Application Priority Data

Dec. 17, 1993 [JP] Japan .................. 5-067408 U

[51] Int. Cl.⁶ .................................................. B60B 37/00
[52] U.S. Cl. .................................. 301/124.2; 301/110.5
[58] Field of Search .................... 301/110.5, 110.6, 301/111, 114, 124.2; 280/220, 278, 287; 70/207, 225, 233; 403/143, 254, 255

[56] References Cited

U.S. PATENT DOCUMENTS

| | | | |
|---|---|---|---|
| 4,438,942 | 3/1984 | Hon | 280/287 X |
| 4,724,692 | 2/1988 | Turin | 70/225 |
| 4,770,011 | 9/1988 | Constant | 70/225 |
| 4,964,287 | 10/1990 | Gaul | 70/233 |
| 5,291,763 | 3/1994 | Cuisinot | 301/110.5 X |

FOREIGN PATENT DOCUMENTS

| | | | |
|---|---|---|---|
| 423491 | 8/1948 | Italy | 301/124.2 |
| 452651 | 11/1950 | Italy | 301/124.2 |
| 460495 | 6/1951 | Italy | 301/124.2 |
| 464381 | 1/1952 | Italy | 301/124.2 |
| 62-17281 | 1/1982 | Japan . | |

*Primary Examiner*—Russell D. Stormer
*Attorney, Agent, or Firm*—James A. Deland

[57] ABSTRACT

A quick release apparatus for a bicycle for pulling and fixing a drawbar having a cam follower formed at one end thereof. The apparatus includes a housing for contacting a bicycle frame, and a rotary cam supported in the housing to be rotatable about an axis substantially perpendicular to the drawbar. The rotary cam is rotatable by a cam lever to contact the cam follower to pull the drawbar toward the housing. The rotary cam and cam lever are interconnected through a coupling device disposed at one side of the housing. The coupling device includes a first coupling for restraining a relative rotation between the rotary cam and the cam lever, and a second coupling for restraining a relative movement in a direction of the axis between the rotary cam and the cam lever.

14 Claims, 4 Drawing Sheets

QUICK RELEASE APPARATUS FOR A BICYCLE

BACKGROUND OF THE INVENTION

1. Field of the Invention

The present invention relates to a quick release apparatus for use in securing a bicycle wheel to a front fork or rear fork, or a bicycle seat to a seat tube. More particularly, the invention relates to a quick release apparatus for a bicycle including a rotary cam for contacting a cam follower formed on a drawbar to pull the drawbar, a cam lever for rotating the rotary cam, and a housing for rotatably supporting the rotary cam.

2. Description of the Related Art

This type of quick release apparatus is described in Japanese Utility Model Publication No. 62-17281, for example. In known apparatus including the one disclosed in this publication, generally, the rotary cam for pulling the drawbar and the cam lever for rotating the rotary cam am formed of the same material to be integral with each other.

In actual use, the rotary cam contacts the cam follower formed on the drawbar to pull the drawbar. Taking strength and wear resistance into account, the rotary cam and cam lever are usually formed of metal, inter alia steel. In the known quick release apparatus, therefore, the rotary cam and cam lever are usually both formed of a ferrous material to be integral with each other.

It is often desired to manufacture a quick release apparatus with the rotary cam formed of a ferrous material but the cam lever having a different length or shape to suit a different type or grade of bicycle. In such a case, with the cam lever and rotary cam formed integral with each other, substantially all of the components except the housing must be manufactured all over again. This tends to increase manufacturing cost.

An example of rotary cam and cam lever formed separate from each other is known from U.S. Pat. No. 4,724,692. In this prior construction, the rotary cam has a bore extending through a rotational axis thereof, and the cam lever has a projection formed remote from a handle portion of the lever. This projection is passed through the bore of the rotary cam to the other end to be retained in place by a portion of the housing. Thus, both the rotary cam and cam lever have complicated shapes, which also tend to increase cost.

SUMMARY OF THE INVENTION

The present invention intends to overcome the drawbacks of the prior art noted above, and its object is to provide a quick release apparatus which may be manufactured at a relatively low cost when a cam lever of a varied shape is to be employed or the cam lever is to be formed of a different material to a rotary cam.

The above object is fulfilled, according to the present invention, by a quick release apparatus for a bicycle comprising a rotary cam supported in a housing to be rotatable about an axis substantially perpendicular to a drawbar, a cam lever for rotating the rotary cam, and a coupling device provided between the rotary cam and cam lever and at one side of the housing, the coupling device including a first coupling for restraining a relative rotation between the rotary cam and the cam lever, and a second coupling for restraining a relative movement in a direction of the axis between the rotary cam and cam lever.

In the above construction, the rotary cam and cam lever are formed separately but inseparably interconnected to be rotatable together. Thus, the rotary cam may be formed of a fixed material and have a fixed shape for use in combination with a cam lever formed of a different material, a cam lever having a different shape, or a cam lever formed of a different material and having a different shape.

Consequently, the present invention allows combinations of different shapes and materials to provide a wide variety of quick release apparatus at a relatively low cost.

In a first embodiment of the present invention, the rotary cam subjected to load is formed of a ferrous material, and the cam lever having a large volume is formed of an aluminum material. This quick release apparatus is lightweight and presents a fine appearance while retaining rigidity. In the same embodiment, the coupling device includes a control shank formed integral with the rotary cam and extending outwardly of the housing. The first coupling is in the form of splines formed on the control shank and cam lever to extend substantially parallel to the above-mentioned axis. The second coupling is a portion of the cam lever forged to press fit on a small diameter portion of the rotary cam formed adjacent a proximal end of the control shank. Further, the rotary cam includes a large diameter portion formed at an end thereof remote from the coupling device to prevent the rotary cam from falling off the drawbar.

In a different embodiment of the invention, the second coupling includes a threaded portion formed on a distal end of the control shank, and a nut mounted on the threaded portion. This embodiment facilitates coupling since a forging process is not required.

Further, the housing may include a projection on an outer surface thereof adjacent the cam lever, with the cam lever including a contact portion for contacting the projection to restrain a pivotal movement of the cam lever when a pulling force of the rotary cam applied to the drawbar reaches a predetermined level. The contact between the contact portion and projection serves as a reference for determining an amount of pivotal movement of the cam lever. This allows an operation of the rotary cam to be carded out as desired at all times to exert a desired pulling action to the drawbar to fix a hub or a seat reliably. In addition, according to this construction to limit the amount of pivotal movement to a fixed range, the housing and rotary cam may be protected from damage due to an excessive load.

Other features and advantages of the present invention will be apparent from the description of the preferred embodiments to be had with reference to the drawings.

DETAILED DESCRIPTION OF THE PREFERRED EMBODIMENTS

Figure 1:
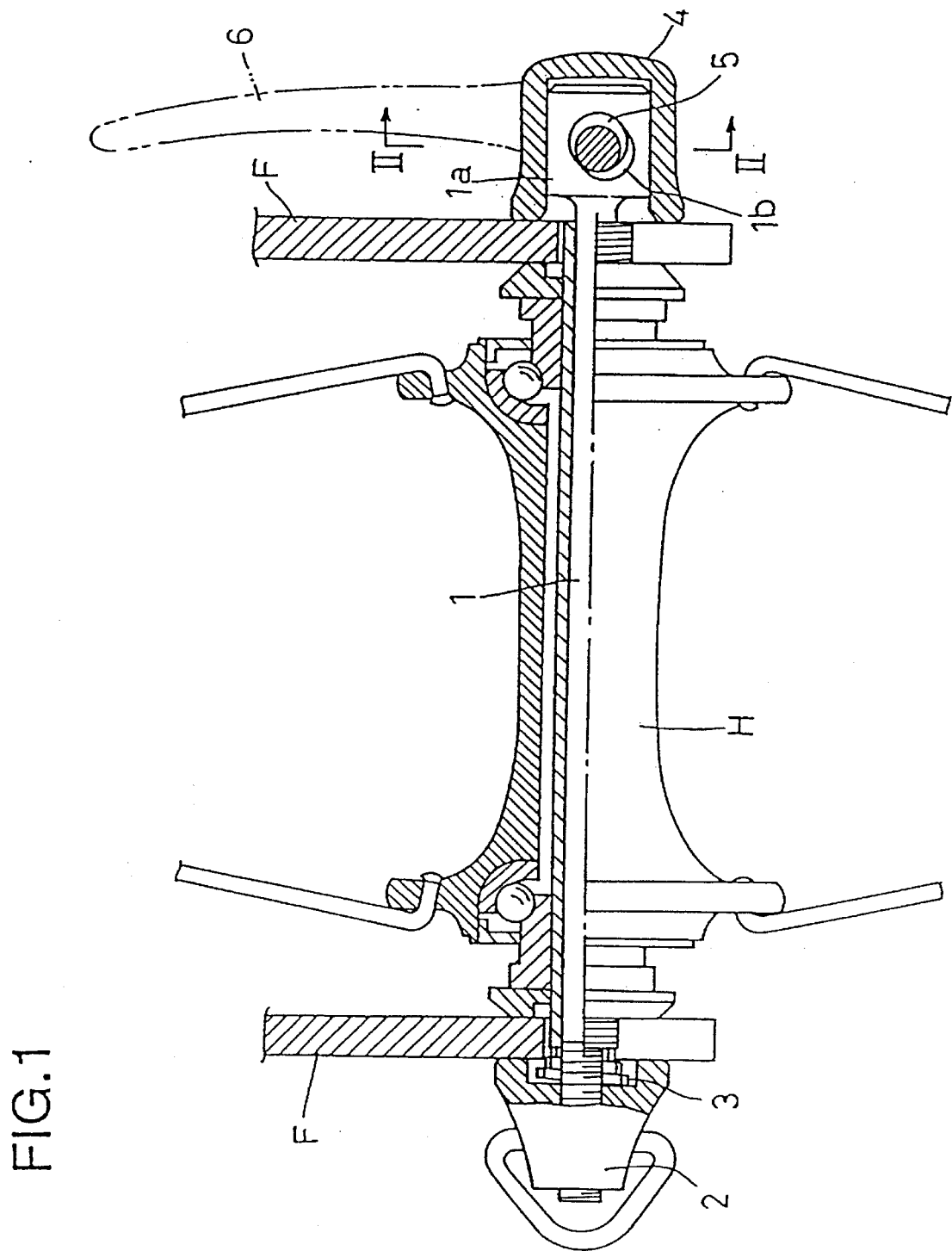
FIG. 1 is a front view, partly in section, of a quick release apparatus according to the present invention, which also shows a bicycle fork, a hub and part of a wheel mounted on the hub.

Embodiments of the present invention will be described hereinafter. FIG. 1 shows a hub assembly H mounted between a pair of right and left front fork blades F, with a drawbar 1 extending through the hub assembly H. As in a conventional construction, an adjusting bolt 2 is screwed to one end of the drawbar 1, with a spring 3 mounted in the adjusting bolt 2. A cylindrical cam follower member 1a is formed integral with the other end of the drawbar 1. The cam follower member 1a defines a cam follower portion 1b in the form of a bore extending therethrough in a direction perpendicular to an axis of the drawbar 1. The cam follower member 1a is disposed in a housing 4 to be slidable axially of the hub assembly H. The housing 4 has a rotary cam 5 rotatably supported therein and disposed in the cam follower portion 1b. A cam lever 6 is connected to one end of the rotary cam 5 to rotate the rotary cam 5.

Figure 2:
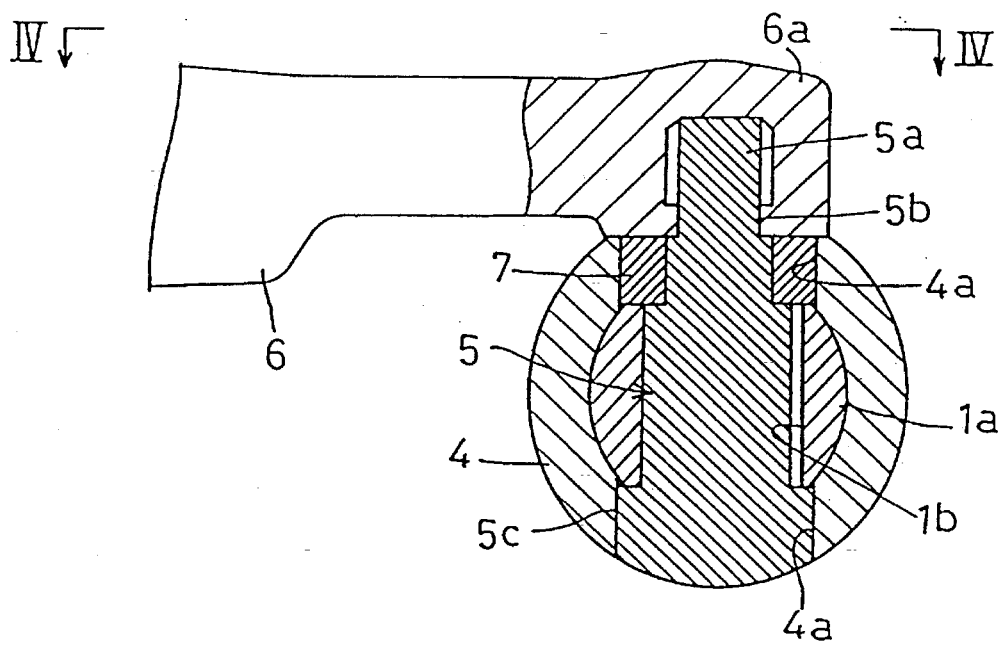
FIG. 2 is a section taken on line II—II of FIG. 1.
Figure 3:
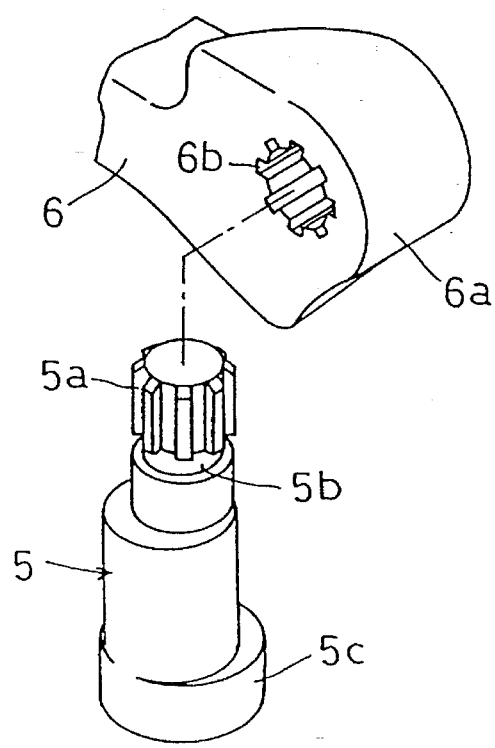
FIG. 3 is a perspective view of a principal portion of the quick release apparatus, showing shapes of couplings formed on a rotary cam and a cam lever.

As shown in FIGS. 2 and 3, the rotary cam 5 includes a splined control shank 5a formed integral with an end thereof adjacent the cam lever 6. A small diameter portion 5b smaller in diameter than an outer periphery of the splined control shank 5a is formed adjacent a proximal end of the control shank 5a to be integral therewith. The rotary cam 5 further includes a large diameter portion 5c formed integral with an opposite end thereof remote from the control shank 5a. This large diameter portion 5c has a larger diameter than the outer periphery of the splined control shank 5a and an inner bore diameter of the cam follower portion 1b. The entire rotary cam 5 including the control shank 5a, small diameter portion 5b and large diameter portion 5c is formed of a ferrous material, with a cylindrical intermediate portion of the rotary cam 5 offset from an axis of the control shank 5a and large diameter portion 5c. The cam lever 6 is formed separately from the rotary cam 5 and of an aluminum material lighter than the ferrous material. The cam lever 6 has a coupling end 6a defining a bottomed, splined hole 6b corresponding to the splined control shank 5a of the rotary cam 5.

Thus, for connecting the coupling end 6a of the cam lever 6 to the control shank 5a of the rotary cam 5, as shown in FIG. 3, the coupling end 6a is fitted on the control shank 5a so that the control shank 5a enters the splined hole 6b of the coupling end 6a. Subsequently, the coupling end 6a is forcibly deformed by forging from outside, whereby the coupling end 6a is press fit on the control shank 5a.

The cam follower member 1a of the drawbar 1 is set in place inside the housing 4 beforehand, and the rotary cam 5 is inserted, the control shank 5a first, through one of bores 4a formed in the housing 4. This is possible since the rotary cam 5 has outside diameters increasing successively from the control shank 5a toward the large diameter portion 5c. After the rotary cam 5 is placed to extend through the bores 4a of the housing 4 and the cam follower portion 1b of the drawbar 1, a bush 7 is fitted on the rotary cam 5 from the control shank 5a. The bush 7 is fitted in the bore 4a of the housing 4 adjacent the cam lever 6 to prevent chattering of the rotary cam 5 relative to the housing 4. This bush 7 is necessary only when the two opposite bores 4a of the housing 4 have the same diameter for facility of manufacture. The bush 7 is dispensable when the bore adjacent the cam lever 6 is formed smaller than the other bore in the housing 4.

After the rotary cam 5 is inserted in this way, the coupling end 6a of the cam lever 6 is fitted on the control shank 5a and forged from outside to press fit on the control shank 5a as described above. This step causes the splined hole 6b of the coupling end 6a to clasp the splines on the control shank 5a hard to be rotatable together. At the same time, part of the coupling end 6a reaches the small diameter portion 5b at the proximal end of the control shank 5a to retain the cam lever 6 in place.

Thus, the rotary cam 5 and cam lever 6 formed separately are interconnected in time of assembly to be inseparable and rotatable together. This construction enables the rotary cam 5 having the fixed shape and formed of the fixed material to be connected to cam levers 6 of varied shapes and materials.

Once the rotary cam 5 and cam lever 6 are interconnected, the large diameter portion 5c of the rotary cam 5 and coupling end 6a of the cam lever 6 act as stoppers to hold the housing 4 therebetween and prevent the rotary cam 5 from falling off the housing 4. When the cam lever 6 is swung, the resulting torque is transmitted through side surfaces of the splines extending substantially radially of the axis of the control shank 5a. These splines transmit the torque reliably, and have a greater wear resistance than, for example, a simple sawtooth-like connecting device.

Figure 4:
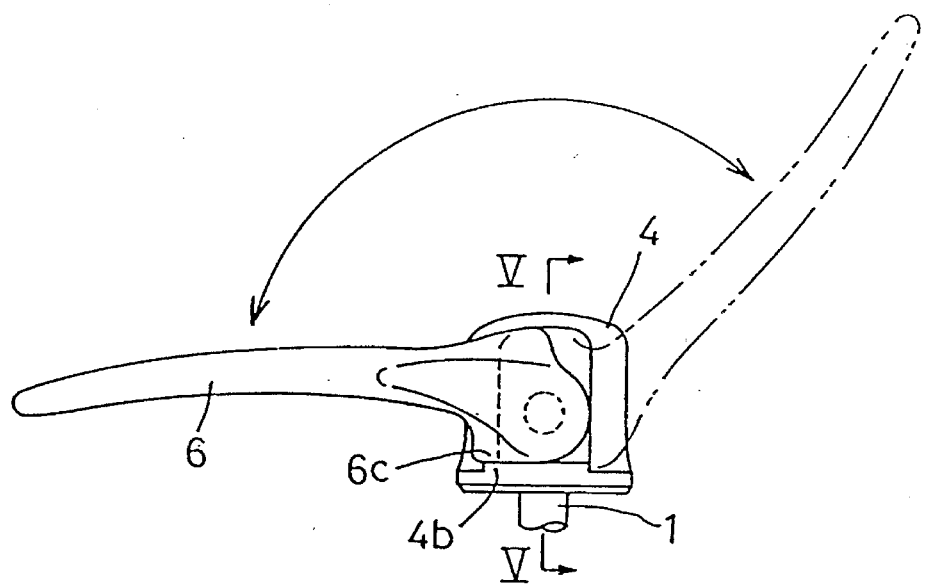
FIG. 4 is a view seen from line IV—IV of FIG. 2, showing pivoting directions of the cam lever and a stopper for limiting a pivoting range of the cam lever.
Figure 5:
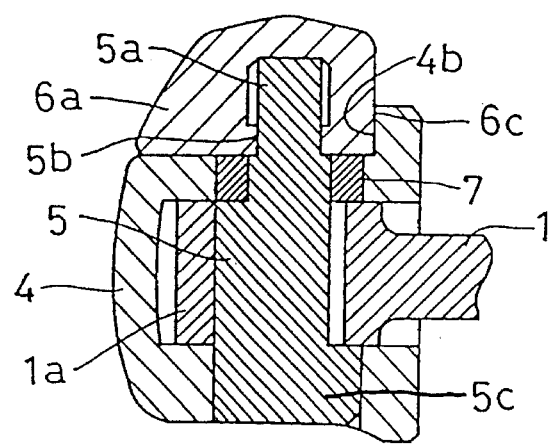
FIG. 5 is a section taken on line V—V of FIG. 4.

As shown in FIGS. 4 and 5, the housing 4 has a projection 4b formed integral with an outer surface thereof opposed to the cam lever 6, while the cam lever 6 has a contact portion 6c formed integral therewith for contacting the projection 4b to stop the cam lever 6 pivoting in excess of a predetermined angle. With this construction, the cam lever 6 may be swung until the contact portion 6c contacts the projection 4b. That is, the contact between the contact portion 6c and projection 4b may be used as a reference for determining an amount of pivotal movement of the cam lever 6. This allows an operation of the rotary cam 5 to be carried out as desired at all times to exert a desired pulling action to the drawbar 1 to fix the hub assembly H to the fork F reliably.

In a conventional quick release construction, a tightening operation is completed by swinging the cam lever 6 from a position shown in phantom line in FIG. 4 to a position shown in a solid line, i.e. approximately through 120–130 degrees. However, in the course of this operation, at about 30–40 degrees from the phantom line position in FIG. 4, the rotary cam 5 begins to press the cam follower member 1a against side walls of the bores 4a of the housing 4. This produces a resistance applied to the pivotal movement of the cam lever 6, which could mislead the operator to think that the tightening operation is completed. According to the above embodiment of the present invention, the cam lever 6 may simply be swung until the contact portion 6c contacts the projection 4b, to establish a relative position between the rotary cam 5 and drawbar 1 to pull the latter with a sufficient force. Consequently, the hub assembly H may be fixed to the fork F reliably.

By employing the construction to limit the amount of pivotal movement to a fixed range, the housing 4 and rotary cam 5 may be protected from damage due to an excessive load.

Other embodiments of the present invention will be described hereinafter. It is not absolutely necessary to provide the control shank 5a of the rotary cam 5 with ordinary splines. This portion is variable, e.g. partly non-circular and the rest presenting a smooth round surface.

Figure 6:
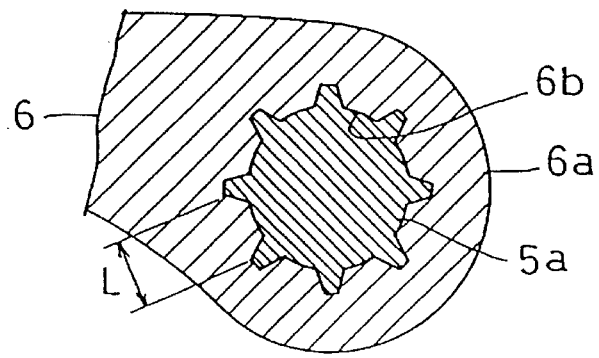
FIG. 6 is a sectional view of a control shank of a rotary cam in another embodiment of the invention.

Further, as shown in FIG. 6, the control shank 5a may comprise a special spline shaft with teeth tapering away from the axis thereof instead of an ordinary spline shaft. This configuration allows the coupling end 6a of the cam lever 6 to define a bore 6b having projections arranged at increased intervals L. The coupling end 6a of the cam lever 6, therefore, has a reduced chance of damage though formed of an aluminum material of less resistance, for example, to bending than the rotary cam 5.

Similarly, the hole 6b in the coupling end 6a of the cam lever 6 may have varied shapes other than the splines. Since the coupling end 6a ultimately is forged to press fit on the control shank 5a, the hole 6b need not strictly correspond to the shape of the control shank 5a. The hole 6b could be circular depending on a forging method.

Figure 7:
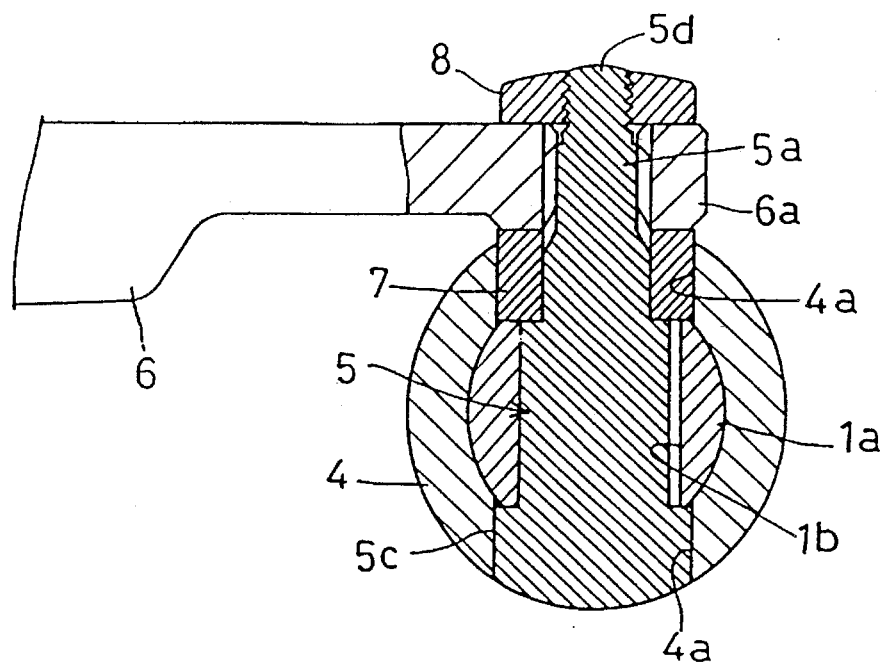
FIG. 7 is a sectional view of a principal portion of a further embodiment of the invention.
Figure 8:
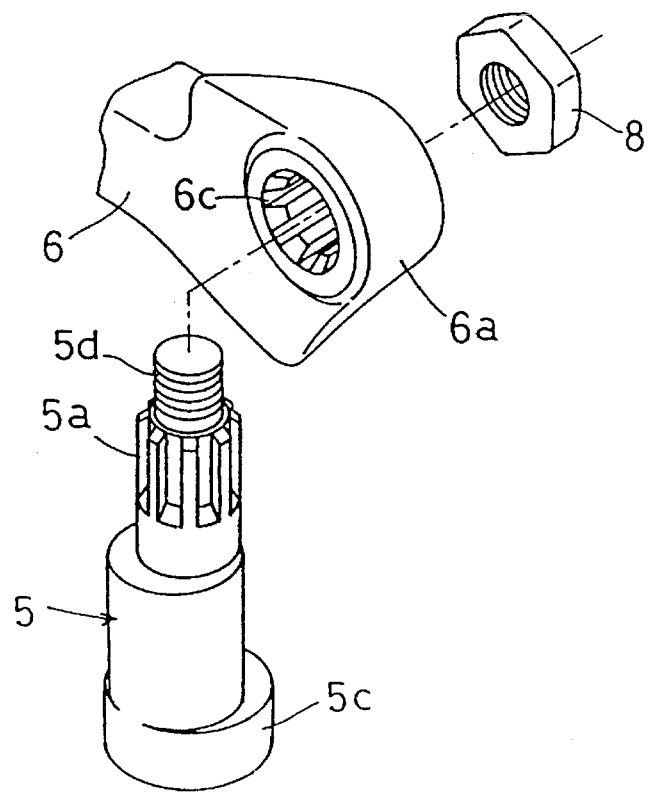
FIG. 8 is a perspective view of the embodiment shown in FIG. 7.

FIGS. 7 and 8 show a further embodiment, in which parts identical to those of the first embodiment shown in FIGS. 1 through 5 are labeled with the same reference numerals and will not be described again to avoid unnecessary repetition.

This embodiment differs from the first embodiment in the construction to retain the coupling end 6a of the cam lever 6 on the control shank 5a of the rotary cam 5. In this embodiment, the rotary cam 5 includes a threaded end 5d extending from the control shank 5a and having a smaller outside diameter than the splined control shank 5a. The coupling end 6a of the cam lever 6 defines a splined through hole or bore 6c instead of the bottomed, splined hole in the first embodiment.

In this embodiment also, the rotary cam 5 is inserted, the threaded end 5d first, through one of the bores 4a formed in the housing 4. The bush 7 is fitted from the threaded end 5d, and the coupling end 6a of the cam lever 6 is mounted on the control shank 5a. As a result, the coupling end 6a with the splined bore 6c is connected to the control shank 5a through the splines to be rotatable together. Instead of being press fit on the control shank 5a, the coupling end 6a is clamped thereto by screwing a nut 8 acting as a retainer, tight to the threaded end 6d projecting from the coupling end 6a. In this embodiment also, the control shank 5a and splined bore 6c may of course have the special splines shown in FIG. 6.

The foregoing embodiments have been described exemplifying a quick release apparatus for attaching the front wheel hub assembly H. The present invention is applicable also to a quick release apparatus for attaching a rear wheel hub assembly or a quick release apparatus for attaching a bicycle seat to a seat tube.

The rotary cam 5 may be formed of various materials other than steel or a ferrous material, e.g. titanium or other non-ferrous material, a sintered alloy, ceramic, or a combination of these materials. The cam lever 6 and nut 8 may be formed of various materials such as steel, stainless steel or other ferrous material, aluminum, an aluminum alloy, other metallic materials, or plastic.

The projection 4b and contact portion 6c acting as the device for limiting the pivotal movement of the cam lever 6 may be replaced with various other constructions, including visible marks, and a further quick mechanism interposed between the housing 4 and cam lever 6.

What is claimed is:

1. A quick release apparatus for a bicycle for pulling and fixing a drawbar having a cam follower formed at one end thereof, said apparatus comprising:

a housing for substantially contacting a bicycle frame;

a rotary cam supported in said housing to be rotatable about an axis substantially perpendicular to said drawbar, said rotary cam being rotatable to contact said cam follower to pull said drawbar toward said housing;

a cam lever for rotating said rotary cam; and coupling means provided between said rotary cam and said cam lever and at one side of said housing, said coupling means including:

a first coupling for restraining a relative rotation between said rotary cam and said cam lever;

a second coupling for restraining a relative movement in a direction of said axis between said rotary cam and said cam lever; and a control shank formed integral with said rotary cam and extending outwardly of said housing; and wherein said rotary cam includes a large diameter portion formed on an end thereof remote from said control shank to prevent said rotary cam from falling off said drawbar.

2. A quick release apparatus as defined in claim 1, wherein said coupling means includes a control shank formed integral with said rotary cam and extending outwardly of said housing.

3. A quick release apparatus as defined in claim 2, wherein said first coupling includes splines formed on said control shank and said cam lever to extend substantially parallel to said axis.

4. A quick release apparatus as defined in claim 2, wherein said rotary cam includes a small diameter portion formed adjacent a proximal end of said control shank, and said second coupling includes a portion of said cam lever press fit on said small diameter portion.

5. A quick release apparatus as defined in claim 4, wherein said portion of said cam lever is forged to extend to said small diameter portion to press fit thereon.

6. A quick release apparatus as defined in claim 2, wherein said second coupling comprises a retainer mounted on said control shank.

7. A quick release apparatus as defined in claim 6, wherein said retainer includes a threaded portion formed on a distal end of said control shank, and a nut mounted on said threaded portion.

8. A quick release apparatus as defined in claim 1, wherein said rotary cam has a substantially stepped configuration having outside diameters successively increasing from said control shank to said large diameter portion.

9. A quick release apparatus as defined in claim 1, wherein said drawbar includes a threaded portion formed at the other end thereof, and an adjusting bolt mounted on said threaded portion.

10. A quick release apparatus as defined in claim 1, wherein said rotary cam is formed of a ferrous material, and said cam lever is formed of an aluminum material.

11. A quick release apparatus as defined in claim 1, wherein said housing includes a projection on an outer surface thereof adjacent said cam lever, and said cam lever includes a contact portion for contacting said projection to restrain a pivotal movement of said cam lever when a pulling force of said rotary cam applied to said drawbar reaches a predetermined level.

12. A quick release apparatus as defined in claim 1, wherein said cam follower is disposed between said large diameter portion and said control shank.

13. A quick release apparatus as defined in claim 1, wherein said large diameter portion has a contact surface extending substantially perpendicular to said axis for contacting said cam follower, said contact surface being positioned such that said cam follower is located between said cam lever and said contact surface.

14. A quick release apparatus for a bicycle for pulling and fixing a drawbar having a cam follower formed at one end thereof, said apparatus comprising:

a housing for substantially contacting a bicycle frame;

a rotary cam supported in said housing to be rotatable about an axis substantially perpendicular to said drawbar, said rotary cam being rotatable to contact said cam follower to pull said drawbar toward said housing;

a cam lever for rotating said rotary cam; and coupling means provided between said rotary cam and said cam lever and at one side of said housing, said coupling means including:

a first coupling for restraining a relative rotation between said rotary cam and said cam lever;

a second coupling for restraining a relative movement in a direction of said axis between said rotary cam and said cam lever; and a control shank formed integral with said rotary cam and extending outwardly of said housing; and wherein said rotary cam includes a large diameter portion formed on a free end thereof remote from said control shank to prevent said rotary cam from falling off said drawbar.

* * * * *